(12) United States Patent
Stirling

(10) Patent No.: US 10,382,890 B1
(45) Date of Patent: Aug. 13, 2019

(54) CACHEABLE GEOGRAPHIC PAGES

(71) Applicant: Bluedot Innovation Pty Ltd, East Melbourne, Victoria (AU)

(72) Inventor: Andrew Stirling, Melbourne (AU)

(73) Assignee: BLUEDOT INNOVATION PTY LTD, East Melbourne (AU)

( * ) Notice: Subject to any disclaimer, the term of this patent is extended or adjusted under 35 U.S.C. 154(b) by 0 days.

(21) Appl. No.: 16/105,643

(22) Filed: Aug. 20, 2018

(30) Foreign Application Priority Data

Jul. 26, 2018 (AU) ................................ 2018902716

(51) Int. Cl.
*H04L 29/08* (2006.01)
*H04W 4/021* (2018.01)

(52) U.S. Cl.
CPC ......... *H04W 4/021* (2013.01); *H04L 67/2842* (2013.01)

(58) Field of Classification Search
CPC ..... H04W 4/021; H04W 4/029; H04W 4/022; H04W 4/02
See application file for complete search history.

(56) References Cited

U.S. PATENT DOCUMENTS

| 9,116,818 | B2* | 8/2015 | Bilange | G06F 12/0866 |
| 9,747,380 | B2* | 8/2017 | Laventman | G06F 16/9537 |
| 10,231,085 | B1* | 3/2019 | Kumar | H04W 4/021 |
| 2017/0192981 | A1* | 7/2017 | Glover | H04L 67/2847 |
| 2018/0007505 | A1 | 1/2018 | Lyman et al. | |

OTHER PUBLICATIONS

Extended European Search Report, European Application No. 18198413.9, dated Apr. 11, 2019, 8 pages.

* cited by examiner

*Primary Examiner* — Nam T Huynh
(74) *Attorney, Agent, or Firm* — Fenwick & West LLP

(57) ABSTRACT

Embodiments are directed to geo-fencing and methods for ensuring the number of elements in a given cache entry in a geo-fence server is consistent, and managing requests to retrieve cache elements from the geo-fence server for use by a mobile computer device. Having determined whether the grid tile within which a mobile computer is located is wholly within the page boundary of a page of geo-fence data, a geo-fence server provides the page to the mobile computer device if the number of geo-fences in the page does not exceed a predetermined number of geo-fences. Otherwise, the size of the grid tile is reduced by a depth index. The geo-fence server then determines if the new smaller grid tile is with the page boundary and performs repeats the process until the appropriate page having an appropriate number of geo-fence data therein can be provided to the mobile computer device.

18 Claims, 10 Drawing Sheets

Example Latitudional and Logitudional Coordinates using WGS 84 standards:
Latitude: -43.84357, Longitude: 135.84352

$\Delta lon = lon2 - lon1$
$\Delta lat = lat2 - lat1$
$a = (\sin(\Delta lat/2))^2 + \cos(lat1) * \cos(lat2) * (\sin(\Delta lon/2))^2$
$c = 2 * \arcsin(\min(1, \sqrt{a}))$
**distance = (Earth Radius) * c**

CACHEABLE GEOGRAPHIC PAGES

CROSS-REFERENCE TO RELATED APPLICATIONS

This application claims priority to Australian Provisional Patent Application No. 2018902716, filed on Jul. 26, 2018, which is hereby incorporated by reference in its entirety.

FIELD

The field of the disclosure in this document is geo-fencing in particular ways to calculate the relative distance of a location of a mobile computer device from a geo-fence and the associated central processing unit cycles involved in such calculations in cases where there are thousands or millions of geo-fences of possible relevance to the calculation.

BACKGROUND

In the following discussion, certain articles and methods will be described for background and introductory purposes. Nothing contained herein is to be construed as an "admission" of the prior art. Applicant expressly reserves the right to demonstrate, where appropriate, that the articles and methods referenced herein do not constitute prior art under the applicable statutory provisions.

Geo-fencing applications executing on a mobile computer device are required to use whatever computational power it has at its disposal to determine the position of the mobile computer device within a common datum, e.g. such as for example a mobile phone. On that mobile computing device, one or more location-dependent applications could be running all of which use the considerable computing power of the device to determine whether that device is at a predefined location, crossed a geographically defined line or is external or internal to a predetermined geo-fenced area, or even approaching one of those lines or area. The applications may also need to report approach, entrance, and exit events of the device entering, being within or exiting a geo-fenced area and these calculations also use the computational power of the mobile computer device or in some cases a remote computer server/s.

Mechanisms of establishing the location of such a device commonly include one or more of, a non-exclusive list: cell tower (phone system) triangulation/trilateration; Wi-Fi triangulation/trilateration; Wi-Fi fingerprinting; visible light-based positioning; Infrared-based positioning; ultrasound-based positioning; applications of satellite-based navigation such as Global Positioning System (GPS); inertial navigation and radio-frequency-based positioning such as Zigbee, ultra-wide-band (UWB) and Low Energy Bluetooth (BLE) signal based trilateration.

As useful as the applications used by a mobile device can be, they can at times use a considerable amount of the memory and central processing power of the mobile computer device. Geo-fencing applications which use high numbers of memory data exchange and central data processing, increase the (typically) battery power used while establishing their location. Each of the location determination mechanisms has a different battery drain characteristic and accuracy of location determination, where generally the greater the accuracy, typically translating into more central processing unit cycles and data memory exchanges, and hence the greater the battery power usage (drain) and different applications using one or more of the mechanisms for establishing location at an appropriate time to suit the needs of the particular application.

In one example of a current geo-fence management arrangement, a very large number of pre-defined geo-fences can be stored in large memory capacity storage array for retrieval and supplied to the, lesser in number but still, a large number of mobile computer devices which have limited memory capacity. The manner in which this is currently achieved tries to ensure that only those geo-fence areas which are near to the current location of the mobile computer device are retrieved and sent to the mobile computer device so as to reduce the calculation load on the mobile device but this means that the remote computer server takes on the calculation load.

This apparently simple requirement however requires the server (or server array and associated memory arrays (both cache and hard drive)) to be able to first receive a location determination from a particular mobile computer device and perform calculations to identify which of the many millions of geo-fences that have been created for many millions of different applications (uses and mobile computer device applications) are within a predetermined distance of the location of that particular mobile computer device at that time. This requirement is then needed for each of potentially millions of mobile computer devices which are sending their location determinations to that same server (or server array) and drawing on that same store of those millions of geo-fences.

To accommodate the relatively small memory capacity of the mobile computer device, only the nearest 256 geo-fence areas are sent to the mobile computer device, which then takes over the distance calculation using its central processor and memory resources.

The time to transfer the 256 geo-fence areas and the data used is clearly much less than if more than 256 geo-fence areas were sent and the practical effect of transferring the processing load to the mobile is manageable within the data transfer and memory capacities of mobile computer devices at the time of filing of this specification.

The processing load of calculating whether any of the millions of mobile computer devices are close to or within one or more of the many millions of geo-fence areas is now off-loaded to the server (s) having access to those millions of geo-fence defining data sets, but, only to the extent that the server(s) is required to perform the 256 geo-fence area determination for each mobile computer device every time a mobile computer device provides a location determination.

The mobile computer device once in possession of the 256 nearest geo-fence areas, then performs calculations to determine for each location update (LU) it performs (GPS, etc.), being a calculated position of the mobile computer device, to determine where it is in relation to each of those 256 geo-fence areas.

As useful as the above arrangement is for current quantities of geo-fence areas and numbers of mobile computer devices needing to access the data associated with those areas, the approach described will not suffice when the quantities of geo-fence areas and numbers of mobiles increase, as they will, since the growth of this activity has been exponential in the past and relatively short time of the existence of this technology.

A highly resource-intensive component of this system is the calculation, in an ad-hoc manner, of the nearest 256 geo-fence areas, centred on the mobile devices' location, which is not cacheable by common techniques due to no two requests having precisely the same location (including from six to nine decimal places in latitude and longitude).

One simple approach to a solution to the above difficulties, is to use rounding (such as to the nearest whole number latitude and longitude of the mobile computer device). This, however, does not allow for the requirement for the computer server to manage the provision of a page with a predetermined manageable size and/or quantity of geo-fences.

SUMMARY

This Summary is provided to introduce a selection of concepts in a simplified form that is further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following written Detailed Description including those aspects illustrated in the accompanying drawings and defined in the appended claims.

In an aspect there is a method for geo-fence management of a number of geo-fences stored in a cache memory store of a geo-fence server for determining pages of information. The cache memory store includes a number of geo-fences in each page having a page boundary, and arranged for providing pages to one or more mobile computer devices wherein and each mobile computer device having a geolocation determination capability and the ability to provide a location update to the geo-fence server. The method may comprise the steps: of receiving by the geo-fence server a location update from a mobile computer device; of determining by the geo-fence server for the location update provided by the respective mobile computer device a grid tile within which the mobile computer device is located; of determining by the geo-fence server whether the grid tile within which the mobile computer is located is wholly within the page boundary of a page. If so, providing that page by the geo-fence server to the mobile computer device, only if the number of geo-fences in the page is less than or equal to a predetermined number of geo-fences. If not, reduction by the geo-fence server of the size of the grid tile of an earlier step by a depth index; and determining by the geo-fence server the new smaller grid tile within which the mobile computer device is located for use in that same earlier step, determining by the geo-fence server a new page and new page boundary having fewer geo-fences than the page of that same earlier step, and performing that same earlier step.

An aspect the method, may also include a step between first and second steps of determining by the geo-fence server if the grid tile identified in a first step is associated with an existing page in the memory store. If so, providing by the geo-fence server the page of information including the predefined number of geo-fences associated with the determined grid tile from the memory store by the geo-fence server to the respective mobile computer device. If not, proceeding to the second step.

In further aspect there is a method to ensure the number of elements in a given cache entry in a geo-fence server is consistent and to manage the number of cache elements of a page of geo-fences and manage the requests needed to retrieve them from the cache memory of a geo-fence server for use by a mobile computer device having a location determination mechanism having provided a location update to the geo-fence server. Steps of the method may include generating a page of geo-fences that has a boundary less than a predetermined depth indexed grid tile; estimating the depth index required, by calculating the logarithm to base (1/N) of the page radius multiplied by a predetermined scaling factor; recalculating the page of geo-fences for the identified higher depth indexed grid tile which contains the subject location update within the calculated page radius, and if the identified higher depth indexed grid tile page contains the location of the location update and also contains multiple other higher depth indexed grid tiles then re-estimate the sub-grid depth index; and then if the generated higher depth indexed grid tile page covers at least one higher indexed grid tile make the generated higher depth indexed grid tile page available to the mobile computer device; otherwise re-estimate the higher depth indexed grid depth and recalculate the page of geo-fences.

"Software," as used herein, includes but is not limited to 1 or more computer readable and/or executable instructions that cause a computer or other electronic device to perform functions, actions, and initiation of actions and/or behave in a desired manner. The instructions may be embodied in various forms such as routines, algorithms, modules, or programs including separate applications or code from dynamically linked libraries. Software may also be implemented in various forms such as a stand-alone program, a function call, a servlet, an applet, instructions stored in a memory, part of an operating system or another type of executable instruction. It will be appreciated by one of ordinary skilled in the art that the form of software is dependent on, for example, requirements of a particular application, the environment it runs on, and/or the desires of a designer/programmer or the like.

Those of skill in the art would further appreciate that the various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally regarding their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A computer server is a collection of hardware and software which provides functionality for other programs or devices, local and remote of the physical hardware and on which one or more virtual servers may reside and operate. A computer server may work in the client-server mode wherein a client sends a request or data to the server and the server responds by processing the request or data and returning data and/or instructions. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer-readable medium such as a RAM memory, flash memory, ROM memory, EPROM memory, registers, hard disk, a removable disk, a CD-ROM, a DVD-ROM or any other form of transitory and non-transitory computer-readable storage medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

It will be appreciated by those skilled in the art that the embodiments are not restricted in its use to the particular application described. Neither are the presented embodiments restricted in their embodiments with regard to the particular elements and/or features described or depicted herein. It will be appreciated that various modifications can be made without departing from the principles disclosed. Therefore, the embodiments should be understood to include all such modifications within their scope.

DETAILED DESCRIPTION

Figure 1:
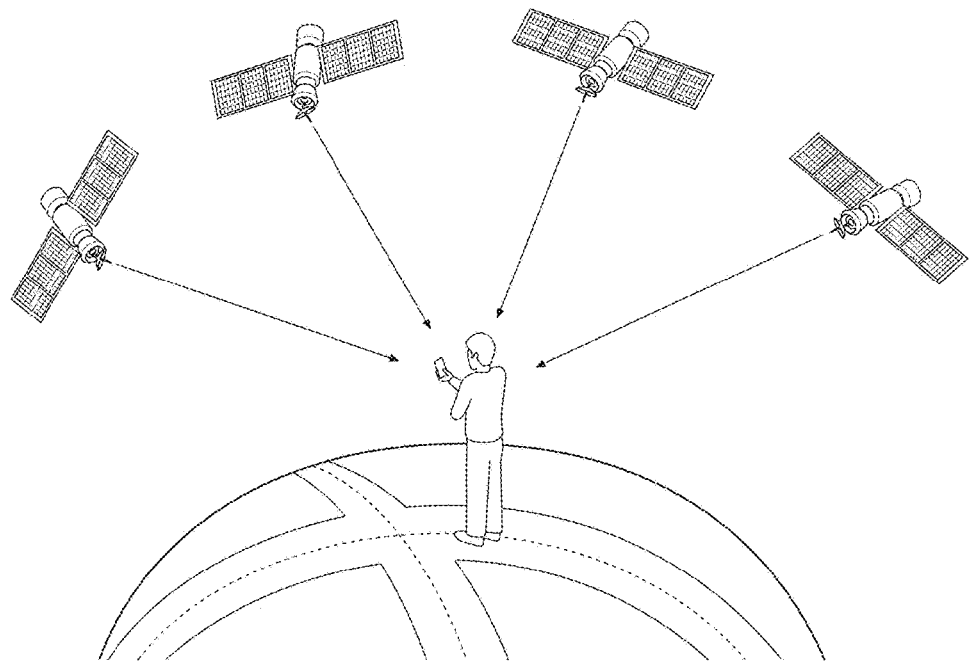
FIG. 1 depicts four satellites being directly received by a mobile computer device. (prior art)

As used in the specification and claims, the singular form "a", "an" and "the" and include plural references unless the context clearly dictates otherwise.

The present disclosure may use the term "comprise" (open-ended) or "consist essentially of" the components of the present disclosure as well as other methods or elements described herein. As used herein, "comprising" means the elements recited, or their equivalent in structure or function, plus any other element or elements which are not recited. The terms "having" and "including" are also to be construed as open-ended unless the context suggests otherwise. As used herein, "consisting essentially of" means that the claimed arrangement, method and system may include ingredients in addition to those recited in the claim, but only if the additional ingredients do not materially alter the basic and novel characteristics as claimed.

Where used herein, the term "and/or" when used in a list of two or more items means that any one of the listed characteristics can be present, or any combination of two or more of the listed characteristics can be present. For example, if a step is described as containing characteristics A, B, and/or C, the step can contain A feature alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, producing, establishing and the like. Such as determining the estimated distance to a geo-fence, to preload a message from a server that is to be displayed when the mobile computer device enters the geo-fence; the location of a mobile computer device with respect to a grid system; counting geo-fences associated with grid tile areas; counting geo-fences in a page; calculating the size of a page, etc. When the term supply, provision, providing or making available is used, it can be a reference to the geo-fence server having data, typically pages, which have been generated and which are pushed (provided) to a mobile computer device, or the page is made available to the mobile device to be sourced from the geo-fence server by for example, the mobile device polling the geo-fence server. The actual mechanism of delivery to the mobile computer device does not change the page data or the nature of its reason for being generated. When the term receiving is used, it can be a reference to the geo-fence server being used to receive data supplied to the server from the mobile computer device, which is used by the geo-fence server for processing or storing of that data. When the term memory store is used it is, in the main, a reference to the cache memory of the geo-fence server arrangement. Cache memory is specifically designed for fast data input and output, as compared to hard drive memory which requires a comparatively longer time to read the same amount of data from its memory store. There is typically less cache memory (elements and virtual size) as it is more expensive than non-cache memory, so the data stored in cache memory tends to be the most used data, and in a geo-fence server arrangement, pages of geo-fences (data copies of a suitable number of the geo-fences per page) are the most used data. Since the most relevant page of geo-fence data is to be provided by the geo-fence server each time a mobile supplies a location update to that server, it is more time efficient to supply those pages which are stored in the cache memory that are relevant to the location of that mobile device.

Clearly, if there is a large number of mobiles being served by the geo-fence server, they may all require the server to provide an equally large number of pages of geo-fences and while the vast array of geo-fences that exist and which are being added as the geo-fences become used by more entities, is typically stored in non-cache type memory, due to the sheer volume of data required to store all those geo-fences, not all of those pages are capable of being provided effectively from the non-cache memory. Thus selected pages are typically served from the cache memory.

To define a predetermined geographic area as being the geo-fenced area, the definition of the area can be, for example, the boundary points defining the perimeter, or information to allow calculation of the area or the perimeter defining the area (e.g. centre point and radius), or a line where one side of the line (the line need not be straight) in which case the deemed area and transition from one side to the other of the line is deemed to be an entry (or exit) to (or from) the predetermined area. This data must be either delivered or already exist within the device conducting the determination, so that it can be referred to. Furthermore, the mobile computer device will have the ability to determine if it is associated with a predetermined area, which in most cases is determined when the mobile computer device enters, or is determined to be within a predetermined proximity of the predetermined area (or to the boundary or perimeter of the area) and therefore becomes associated with an area. It is to be understood that entering an area is equivalent to crossing a perimeter or boundary defining the area, and similarly proximity to an area is equivalent to proximity to a perimeter or boundary defining the area. For the sake of convenience, The term 'area' will be used throughout the specification but is to be understood as an equivalent reference to the perimeter defining a zone, unless the context suggests otherwise. It will also be readily understood that although the majority of geo-fences are 2-dimensional, there can also be 3-dimensional geo-fences and the embodiments described herein are not restricted to the dimensional requirements used in the description.

Predetermined proximity can be a fixed distance from the geo-fenced area, in the example of a circular area, the fixed distance could be a nominated radial distance or a percentage of the radius of the circular area. In another example, the predetermined proximity could be an allowance of error in the determination mechanism which is greater than that expected. In yet another example of predetermined proximity the proximity could be determination of the location within a larger/smaller or differently shaped geo-fenced area than a primary geo-fenced area.

When referring to a device, the scope will include without limitation mobile computer devices, in particular, mobile phone devices, but the term will also include, by way of example, computer devices which are part of a mobile platform, such as a vehicle including a rail mounted vehicles such as a train or tram, or attached to or physically associated with a person, an article or group of articles, such as cargo, transported goods, a container (empty or occupied), a pallet, and can also include a virtual device which is embodied in software running on a computer which is part of a mobile computer device, a vehicle, transported article or the apparatus for transportation such as a container, pallet, etc. Thus the term device or mobile computer device when used in this specification shall have a broad meaning in the context of the embodiments described herein.

Referring to FIG. 1 the most common mobile determination technique is to use the Global Positioning System (GPS) which relies on a network of satellites to provide a signal which is interpreted by a GPS receiver chip in the mobile computer device and transformed into a location determination at each Location Update (LU).

The manner in which a device provides location can also depend on the technology that is used to derive that location. There are numerous technologies for position determination and associated with each technique there will be specific details of their accuracy. A location is often expressed using the WGS (world geodetic system) 84 standard. This particular standard for location expression is used as the basis for expressing locations within GPS and all common smartphone platforms. However other location determination quantification standards (or coordinate reference systems) exist that do not fall under WGS 84 and may be used such as ED50, ETRS89, GRS 80, NAD 83, DAVD88, SAD69, SRID and UTM. The use of a standard ensures that all manufacturers that design GPS devices and that use the output from such devices can readily generate GPS data that will be accepted by users of that GPS data to add value to the location determinations provided. As for all real-world systems, there is an error which needs to be accounted for, and accuracy is affected. By way of explanation without providing more of the relevant details, GPS error analysis examines the sources of errors in GPS results and the expected size of those errors. GPS makes corrections for receiver clock errors and other effects, but there are still residual errors which are not always correct or corrected. Sources of error include signal arrival time measurements, numerical calculations, atmospheric effects, ephemeris and clock data, multipath signals, and natural and artificial interference. The magnitude of the residual errors resulting from these sources is dependent on geometric dilution of precision. Thus when the term "location determination" is used the actual manner in which a location is presented is wholly dependent on the location determination technique used to determine that location and that there will be a known accuracy of determination which itself may be dependent on the application of the respective technique to the circumstances of the determination and which may be applicable to the determination only at the time of the determination and updated with future determinations. For example, a GPS location determination can have a range of accuracies, mostly dependent on the number of satellites, and in some cases, their relative geometry, that is available from which to derive the location complicated by one or more of the errors noted above.

In the application of the method described in this specification, there is preferably use of a predetermined accuracy of location determination associated with each location determination technique available to the device and that accuracy is expressible as a distance so that it can be used in the process of determining when to change the technique of location determination. It may be that the predetermined accuracy of the location can be different for the same technique dependent on other measurable or known criteria, so that in a particular known location, such as in a densely built-up area, the accuracy is known to be less, and then the predetermined accuracy used by the same technique is an adjusted value, expressed as a distance.

The device may have the ability to initiate a predetermined action originating within the device or communicating an initiation command to a secondary device/system when a location determination technique establishes that the device is associated with a predetermined geo-fenced area, for example has entered or is in the proximity of a predetermined area which the mobile computer device then associates with an action.

Figure 2A:
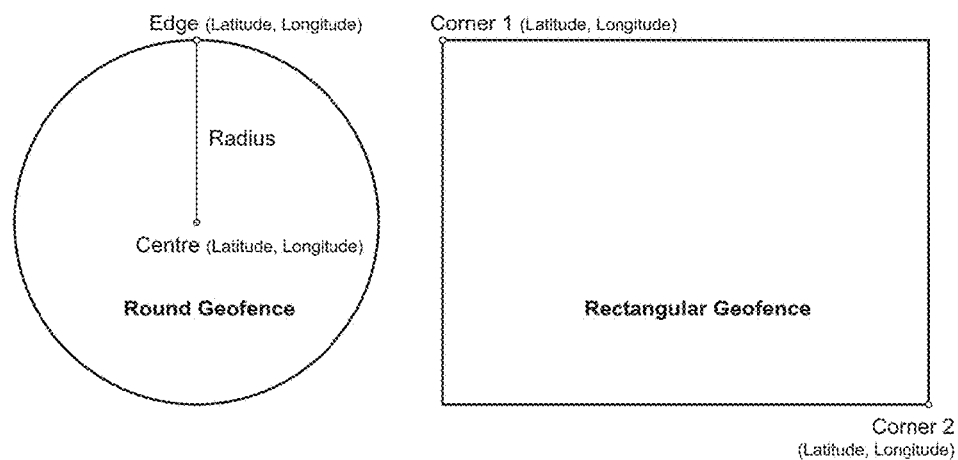
FIG. 2A depicts examples of geo-fences (prior art)

A geo-fenced area can be represented as a geographic area defined by a set of geographic coordinates as depicted in FIG. 2A (PRIOR ART). These coordinates can be based on different geodetic systems or datum, such as the WGS 84 datum or any other geodetic system or datum that is or will be used to provide geodetic references. A common computer code representation of a geo-fenced area is a string of data where each discrete piece of data within the string represents a decimal coordinate matched to that of the geodetic system in use. Decimal representations of coordinates give a continuous data format for representing WGS 84 data. An example of this representation being Latitude-Longitude pair: −37° 48' 47.9556", 144° 57' 5.745" equating to Latitude-Longitude: −37.813321, 144.951596.

An example of a string of data representing a geo-fence using WGS 84 is [−37.821525, 144.95563], [−37.815762, 144.974599], [−37.807828, 144.971595], [−37.813321, 144.951596], [−37.821525, 144.95563]. The length of the string is dependent on the number of coordinate pairs that represent the area and the precision of the location translated into the number of decimal points to which each coordinate is defined. If an area is defined by a circle, then it will be represented in computer code by a string of data containing at least one coordinate representing the center of a circle and at least a radius distance. Alternatively, the area can be defined as a polygon with N corners and would thus be represented by a string of data containing N coordinates where the coordinates represent the corner location of the polygon defining the area. As illustrated in FIG. 2A, assuming that the East-West and North-South boundaries align with respective latitudes and longitudes it suffices to define an area by using two coordinate pairs.

Figure 2B:
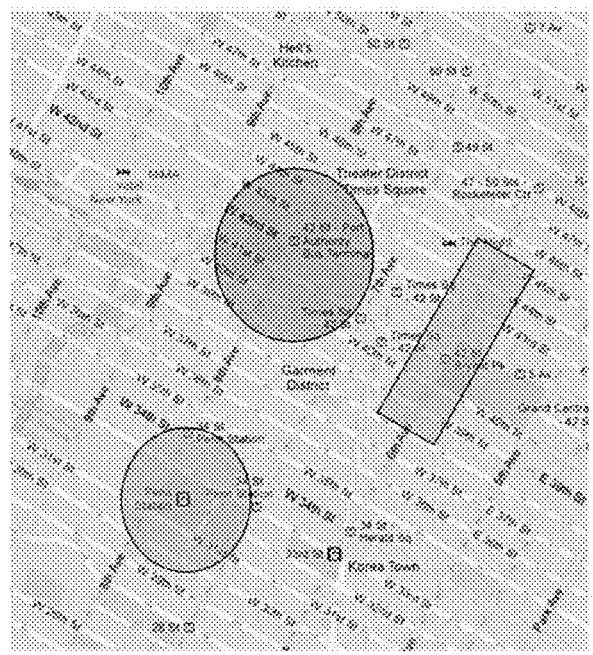
FIG. 2B depicts example mappings of geo-fences (prior art)

FIG. 2B (PRIOR ART) depicts some examples of geo-fenced areas over-laying a mapped area of city blocks, to illustrate the real-world application of the geo-fence area. Of course, there are hundreds if not thousands of geo-fences that apply to even small areas of a city, and then there are thousands of cities each with their array of geo-fences meaning there can be many millions of geo-fences to manage. It will thus be understood that the server(s) that have access to the data that defines all those geo-fences need then to deal with the many calculations required to assist the many hundreds and thousands of mobile computer devices located within and near those cities and respective geo-fences. It is not efficient or readily manageable for every mobile computer device to have a copy of this data, apart from its large memory requirements, the data is being added to, and modified continuously, which means that the data communications requirements alone would likely be unacceptable to the mobile computer device user.

A computer device is ideal for calculating whether a determined location of a device is within a geo-fenced area. The software code to do so is well known to those of skill in the art. There are a variety of programming and mathematical approaches to achieve that determination to a predetermined or acceptable accuracy, keeping in mind the fundamental accuracy of the location determination process itself.

The execution of location determining and calculating code can be performed by a geo-fence server(s) or in the mobile computing device. Indeed at times, a combination of the geo-fence server(s) and mobile computing devices will perform these calculations at different stages and for different purposes but the calculations are generally much the same as long as the LU's are available as well as the relevant geo-fenced areas.

Figure 3:
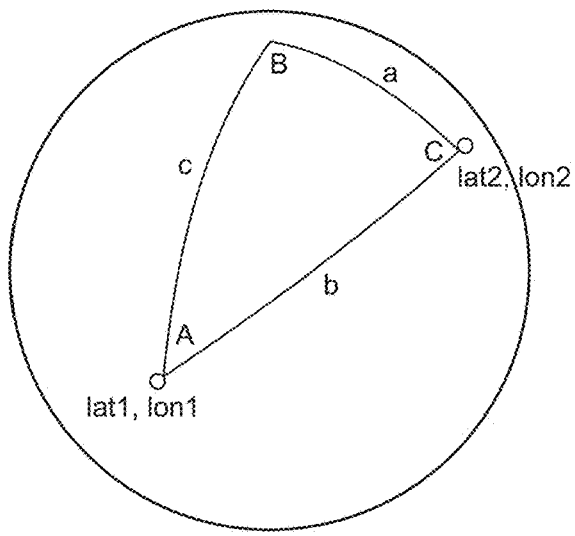
FIG. 3 depicts a pictorial representation of a distance measurement and a formula for performing that calculation. (prior art)

FIG. 3 (PRIOR ART) is an illustration of the type of calculation performed in the mobile computer device or the geo-fence server(s) assisting the mobile computer device, where one of the complicating factors is taking the curvature of the Earth into account, as illustrated by the shapes and lines depicted in FIGS. 1 and 3. In one example, all calculations are performed using 3 dimensional rather than two-dimensional coordinates within the chosen datum, for example as depicted using the formula depicted in FIG. 3 which applies for small angles as would be the case in geo-fence applications where the geo-fence is typically a local area not a country's surface on the Earth. Furthermore, because the curvature of the earth is not spherical but ellipsoidal (since the volume of the Earth is oblate, not spherical) the complexity of the calculation increases for long distances. If the elevation is required, then a geoid model can be used so that some calculations will require an elevation component. Thus when location determination by the device is infrequent or when the geo-fenced area is a simple shape, the number and complexity of calculations performed is modest compared to frequent determinations and more complex geo-fence shapes regardless of the distances involved.

It is possible to use the Haversine formula (provided in FIG. 3) to calculate the great circle distance between two points being the shortest distance across the surface of a spherical estimation of the Earth.

$$a = \sin^2(\Delta\varphi/2) + \cos\varphi_1 \cdot \cos\varphi_2 \cdot \sin^2(\Delta\lambda/2)$$

$$c = 2 \cdot a \tan 2(\sqrt{a}, \sqrt{(1-a)})$$

$$d = R \cdot c$$

where $\Delta\varphi = \varphi_1 - \varphi_1$; and $\Delta\lambda = \lambda_2 - \lambda_1$; and $\varphi_1$ and $\varphi_1$ are latitudes of point 1 and point 2; and $\lambda_1$ and $\lambda_2$ as longitudes of point 1 and 2; and the symbol R is Earth's radius (mean radius=6,371 km);

Note that angles need to be in radians to pass to trigonometric functions. Note concerning FIG. 3, the symbol c is the angular distance in radians, and the symbol a is the square of half the chord length between the points. Calculations of this type are well known and the code to implement them equally well known and available as subroutines in various computer-executable languages and code.

If the elevation is required, then a geoid model of the Earth can be used so that some calculations will require an elevation component.

When trying to determine the location (Location Update (LU)) of the device in relation to a rectangular or square geo-fence located on the surface of the earth, it is possible to calculate the distance of the device from the geo-fence by performing a simple point to line calculation (in 3 dimensional space) which determines the position of the device in relation to each side of the rectangle or square. This involves at least 4 calculations per geo-fence since, at each location update, a devices' CPU will only perform 4 calculations (still involving multiple cycles but very much less than otherwise would be the case). Another way of determining distance would be to choose to calculate the distance to all of the vertices/vertex of the geo-fenced area, which are readily available, since they can be used to define the geo-fenced area very easily, and assumes that the line segments of the rectangle or square are derived from them anyway.

Similarly, when trying to determine the location of a device in relation to a circular geo-fenced area, the computational method of calculating the distance between the device and a circle (or half sphere) in three dimensional space is difficult to do, and it is much simpler to calculate the distance between the device from the centre of the geo-fence circle, which is used in any event to create the circular geo-fenced (2-d) area and then subtract the radius of the circle from the distance calculation, rather than perform multiple calculations determining where the device is in reference to multiple points along the circumference of the circle or a the points on the surface of the half sphere.

When applying similar logic to understanding where a device is in relation to a polygonal geo-fenced area, the number of necessary calculations increases dramatically with the number of edges and corresponding vertices/vertexes that the polygon has. With complex polygons containing thousands of edges and respective vertices/vertexes, the number of calculations performed each time a device establishes its location will be significant.

To add to the complexity there can be a significant number of geo-fences in the vicinity of the device (some mobile computer device operating systems limit the number of potentially active geo-fences, so in most operating systems there is a limit of 256 geo-fence areas for each mobile at a particular time), thus calculations for each active geo-fence is required so that the device can establish its location and relative position to a mobile derived location Update (LU) multiple times a second, and the number of calculations required each second grow and can then only be limited by limiting the number of geo-fences being used, many of which, if not presently the case (circular geo-fences are predominate at the time of filing) in the future, will comprise polygonal shaped geo-fenced areas in 2- and 3-dimensions. Such shapes are not merely theoretical flights of fancy, but representative of real-world safety and commercial needs, hence the shift to more complex geo-fence shapes.

What is happening in this example, is that the mobile computer device has been provided at least 256 geo-fences of the nearest geo-fences that can be used depending on the application that is being executed, either in relation to the application present on the screen of the device at that time, i.e. in the mobile computer devices foreground processing, or as is the case most of the time, an application is running in the background, and thus the calculations are being done in the background of the operation of the mobile computer device. The user is typically not aware of this activity by the mobile computer device.

Figure 4:
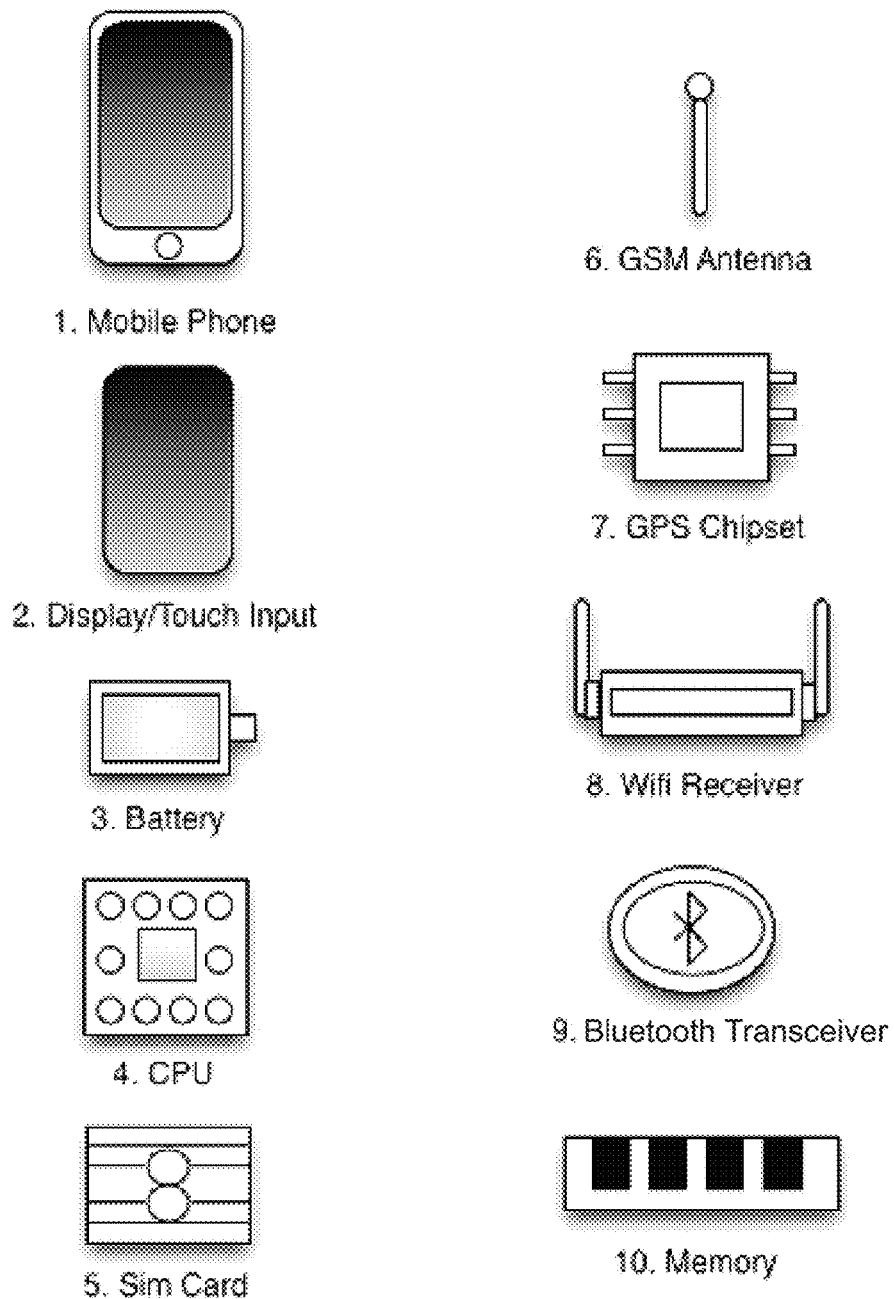
FIG. 4 depicts an exemplary hardware configuration of a mobile computing device.

As depicted in FIG. 4 an embodiment of a mobile computing device in the form of a mobile phone which is depicted as having the following elements:

1. The mobile phone as a whole is an aggregation of the following briefly described elements along with any stored software which will be executed to make the mobile computer device perform actions that are unique to the circumstances of its use, including determining its location and provision of information to the user of that mobile computer device, but this illustration is not meant to be exhaustive rather it is indicative of the elements which assist in the performance of the embodiments described herein.

2. The display/touch input of the device that allows users of the device to receive visual information and provide input and instructions to the device by touching areas on the screen corresponding to certain actions to be performed. Not shown is the ability of many mobile computer devices to receive and act on verbal commands and queries which also form an input to the device.

3. The battery stores electrical charge and distributes it to other parts of the device thus powering their functionality, such as the central processor, the memory, the Subscriber Identity Module (SIM) card, the GPS chip set and the various communication mechanisms.

4. The central processing unit of the devices is the computer device component which processes data, receives digital data input and sometimes analogue data input, and using stored (in the memory) or received program data, commands as well as manages the functionality of other elements of the device.

5. The SIM card is a component required by the mobile computer device to enable it to use various communications elements to communicate with and through a telephony service provider. In this embodiment, the Global System for Mobile (GSM) telephony standard is used to communicate with and through the predetermined service provider via a pre-established account. In other embodiments, other telephone standards may be used (including various 3G, 4G, and 5G standards such as CDMA, W-CDMA, HSPA, SC-FDMA, UMTS, LTE, etc.). If the mobile device does not use or need a SIM it will have a two-way radio communication capability but even that will require a mobile computing device identity to operate within the radio communications system.

6. The antenna is tasked with receiving and sending radio frequency signals to communicate with, in this example, the GSM network and transfer data to and via that network to other telecommunication devices and geo-fence server(s) connected, typically using the Internet. In one embodiment of the arrangement, the device can determine its location by triangulating its location from various known (location) sources of GSM signals. This function is typically built into such devices as there are already techniques for determining the distance of the mobile computer device from one or more transmitters and receivers to efficiently control the power of transmissions to and from the mobile computer device.

7. The GPS chipset within the device is specifically designed to process signals received from positioning system satellites such as, but not limited to satellites using the Global Positioning System that are orbiting the Earth. By processing these signals, the GPS chipset can determine its location with respect to those satellites and thus is location according to a geospatial coordinate system. Other satellite location determination systems would refer to this chipset by different acronyms, but the functionality is much the same in that the output is a location defined using a predetermined datum.

8. The Wi-Fi transceiver allows the device to receive and transmit Wi-Fi signals (typically in accordance with a standard 802.11 xx) and communicate with Wi-Fi networks that it can detect and with which it is permitted to communicate. The Wi-Fi transceiver can also determine its location by triangulating and analysing ambient Wi-Fi signals, since the location of WiFi routers are also known in some systems.

9. The Bluetooth element allows the device to send and receive Bluetooth (typically in accordance with a standard 802.15.v) signals and communicate with any Bluetooth networks or enabled devices that it can detect and with which it is permitted to communicate. The Bluetooth element can also determine its location by triangulating/trilateration and analysing the ambient Bluetooth signals in certain circumstances.

10. The Memory enables the device to permanently or temporarily store digital data representing various program data, and other data and information, and which allows access to that stored program and data. As will be described in more detail in the specification the memory will preferably contain, in an embodiment, digital data representative of 256 geo-fence areas and a program which performs the actions required in the circumstances of that particular mobile computer device in that particular location for that particular user of the mobile computer device.

Figure 5:
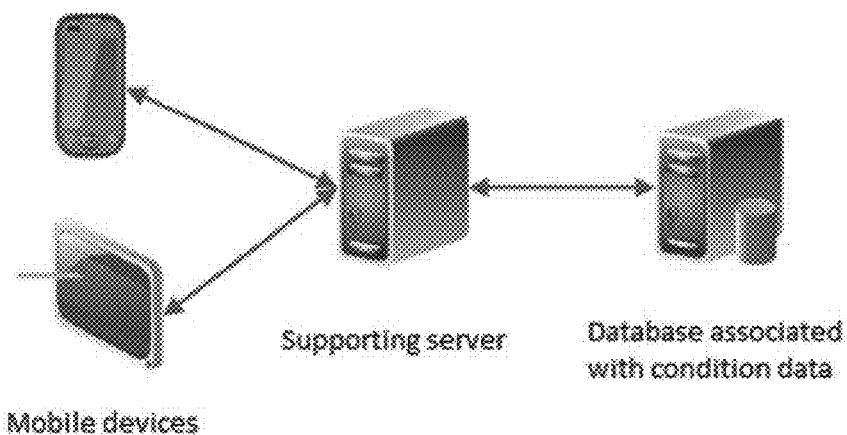
FIG. 5 depicts an exemplary hardware configuration of a geo-fence server arrangement and a mobile computing devices.

FIG. 5 depicts at least one geo-fence server but typically many geo-fence servers, working on the provision of the geo-fences that are relevant to that particular mobile. These geo-fence servers are able to access vast arrays of digital data in hard-drive based (non-cache type) memory devices that can be proximate or remote of the geo-fence servers. The data contained in the array of memory devices is made available to the geo-fence servers and the memory devices also receive and permanently or temporarily store received data. A memory cache is typically a memory from which high speed retrieval is possible and as it is a special form of memory it is more expensive and thus less in size to most other forms of memory associated with a geo-fence server. Hence use is made of this type of memory for special circumstances and in this embodiment is the primary source location of pages of geo-fences to be provided to the mobile computer devices.

FIG. 5 illustrates a database server which is a typical configuration since the function of a database typically requires its own central processing unit/s and data referenced by the database server is stored logically but physically will be remote of the actual geo-fence server. It is also typical for server(s) to be virtual in that although physical devices are illustrated in FIG. 5 there may actually be only one physical server (CPU and Random Access Memory) but there can also be multiple virtual servers (software running on the physical server which mimics the functionality of a computer server). There are many alternative configurations and architectures for creating a computing environment suitable or adapted to perform the required calculations/determinations/productions/estimations involved in the performance of the disclosed methods but the methods themselves will provide for the advantages described herein, particularly the optimised use of cache memory for all its advantages in a very calculation and data delivery/provisioning intensive environment.

By way of example only, a fixed sized "page" containing a specific number of geo-fences located nearest to the mobile computer device is generated by the geo-fence server(s) completely dynamically based on a mobiles device's location, and refreshed from the geo-fence server(s) periodically or if the device approaches the boundary of the "page". By way of illustration a page of data can have a size of 220 kB (220 kilobytes), and each of them generally with different data even though mobiles may be within the vicinity of each other, is an amount of data multiplied by the number of mobile computer devices being serviced by the geo-fence server(s). This process and the associated processing by the geo-fence server becomes impractical at large scale, as the calculations to determine the closest points of data that make up the geo-fences to a given Location Update (LU) is computationally intensive and the vast amount of data becomes inefficient to store and supply in a time inefficient manner if the data is not stored in fast memory located adjacent the central processor, often referred to a cache memory. Therefore, a method has been developed involving the use of cache memory of the geo-fence server (s) (sometimes referred to as caching) to supply a page of geo-fence data in such a way as to reliably ensure that the mobile computer device's LU is covered by at least one page of information and that the size of each page size is manageable by being similar if not consistently the same size.

To create a reliable addressable index space, an index is used that is consistently determinable simply from location alone (derived from two key parameters). It was also determined that the fundamental address space of geographic grids which can be ascribed to cover the surface of the Earth, can be uniquely identified by noting the first decimal point of the latitude and longitude coordinates, rounded down (in this embodiment). Hence, −13.45 degrees latitude and 45.23 degrees longitude would be rounded to −13.5 degrees latitude and 45.2 degrees longitude). This approach creates a basic grid tile of variable surface area but typically is in the 100-120 km2 (square kilometers) range. At locations close to the equator the basic grid is larger in area than the basic grid more Southerly or Northerly of the Equator.

The existence of associated geo-fence areas in each basic grid tile being an area ascribed by the identified grid tile creates inconsistently sized pages of geo-fence data associated with each basic grid tile due to the different number of geo-fences mapped on to the Earth in metropolitan and city areas which will have high a density of geo-fences compared with other areas, particularly country areas. To deal with that characteristic there is disclosed in this specification, a method of identification of a grid tile identification system which is adapted to create a further layer of resolution when needed, and which allows for geo-fences to be associated with a grid tile smaller than the basic grid tile which means that fewer geo-fences can be associated with a grid tile and the corresponding page size is commensurately more manageable and consistent. This specification also describes methods to deal with the management of the caching of pages in a geo-fence server so that pages can be re-used.

If the surface area of an identified geographic grid tile is associated with page of geo-fences and is of a manageable size, meaning that the page made available to the mobile computing device has a consistent number of geo-fences therein, and it is determined that that the geo-fences in the page cover is larger area than the basic grid tile area, it may be that the adjacent grid may also fall with the geo-fences in the page, and if so it is possible to use the "reference" to the original grid, so that when a mobile computer device is in an adjacent grid tile area it can use the referenced page and thus this referencing can quickly resolve many grids at once. This can be, in an embodiment recursive, such that grids adjacent to a reference grid may, themselves, become reference grids to the originally calculated grid, as appropriate (see FIGS. 6, 7 and 8).

A geo-fence server is preferably managed to make the extremely large number of geo-fences stored in its associated memory store available for provision to one or more mobile computer devices. The mobile computer devices all have a geolocation determination capability and the ability to provide a location update to the geo-fence server.

The geo-fence server is further managed to provide pages of information each including a predetermined number of geo-fences, which are preferably of a consistent page size to the mobile computer device where that will depend on the best size for provision to the mobile computer devices, various page sizes are in use and their size may become larger in the future, thus the predetermination is a matter of engineering choice.

The geo-fence server receives a location update from a mobile computer device in the form of a data string according to a known datum. The geo-fence server can then determine from location update which grid tile the mobile computer device is located. The determination of the most suitable grid tile (one that could be smaller than the basic grid tile) is made according to the geo-fence server ability to assess the relative size of pages and corresponding grid tiles of various areas which are wholly contained within the page boundaries. This aspect is disclosed in greater detail later in the specification.

In an embodiment, the geo-fence server receives a location update from a mobile computer device which is uses to determine for the respective mobile computer device a grid tile within which the mobile computer device is located.

In an embodiment the geo-fence server determines whether the grid tile within which the mobile computer is located is wholly within the page boundary of a page. The calculation of a page boundary of a page is described later in the specification.

Further, in the embodiment, the geo-fence server then determines whether the number of geo-fences in the page associated with the determined grid tile is less than or equal to the predetermined number of geo-fences and if so, the geo-fence server can provide that page to the mobile computer device, but only if the number of geo-fences in the page is less than or equal to a predetermined number of geo-fences.

The geo-fence server can then provide a page of information including the predefined number of geo-fences associated with the determined grid tile from the memory store by the geo-fence server to the respective mobile computer device having determined that the size of the page is similar and consistent with other pages. If the grid tile is associated with a particular page at time t1 and no changes have occurred in the underlying data within the page boundaries when a future location update is provided at time t2, either from the same mobile device or another mobile device, then it is possible for the same page to be provided from the cache memory where the page has been stored for fast retrieval. This embodiment thus provides efficient provision of pages of geo-fences to the mobile computer devices very promptly in response to the provision by the mobile computer device of an LU.

Cache Insertion (Page Size Boundary is Larger or Equal to a Basic Grid Tile)

Figure 6:
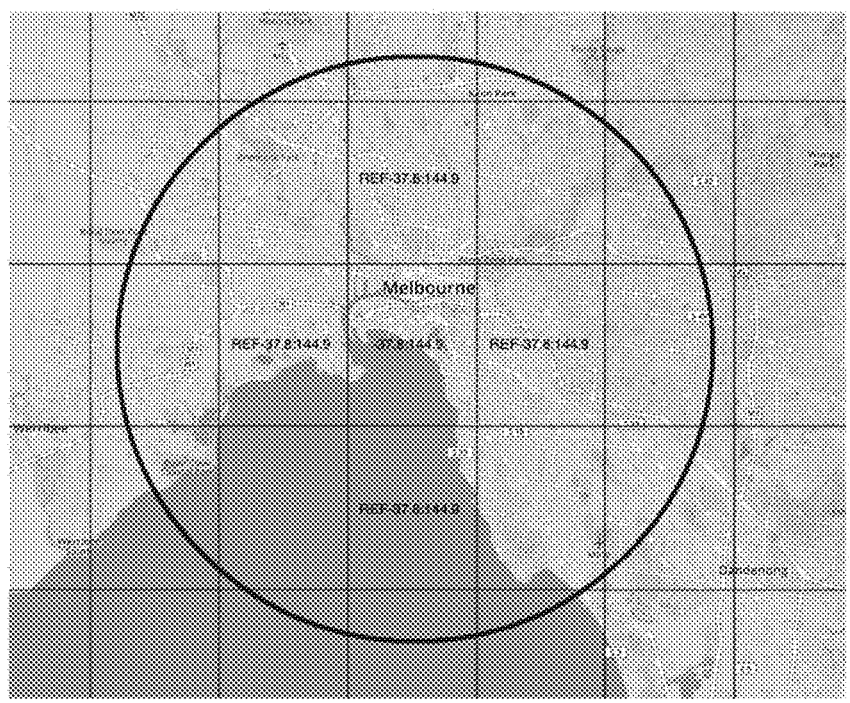
FIG. 6 depicts a map page showing a large geographic area over-laid with mapped basic grid tiles.

FIG. 6 depicts depicts a page which covers a large geographic area and there are five grid tiles of relevance totally within the circular geo-fence, namely REF-37.8.1449.

Figure 7:
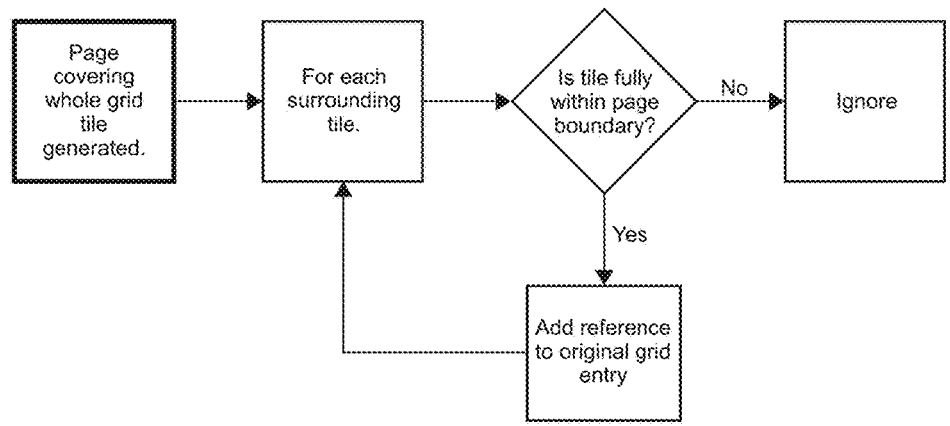
FIG. 7 depicts a flow diagram illustrating the logic followed when a page covers at least one basic grid tile.

FIG. 7 depicts a flow diagram illustrating the logic followed when a page covers at least one basic grid tile, meaning that there are more geo-fences in the page data that do not lie within the basic grid tile. The start of an embodiment of a process is the generation of a page of data covering the whole grid tile, where page data is the digital representations of geo-fences that are to be used by the mobile computer device/s. Then for each adjacent grid tile it is preferred to check if that adjacent grid tile is fully within the page boundary of the page of data, and if not ignore that adjacent grid tile. But, if it is such that an adjacent grid tile lies within the page boundary of the page of data, then a reference to the page of data is associated with that adjacent grid tile, meaning that associated with the one page of geo-fences there is the basic grid tile, and in this case four other (adjacent grid tiles) that are encompassed by the geo-fence data within that page. A page boundary is computer performed calculation that creates a virtual area representative of all the geo-fences (two or more (latitude, longitude) pairs per geo-fence, that are associated with a page of data).

There are many ways of creating approximations of the page boundary as well, and they are included in this disclosure. In one example, although this method of calculation may project a larger area than the overlapped geo-fenced area a page boundary can be more simply calculated, e.g. the most Northerly and Southerly latitudes of any point on any of the geo-fences in the page become the North and South bounds and the most Westerly and Easterly longitudes of any point on any of the geo-fences become the West and East longitudes of an area which bounds all of the geo-fences. In another example it is a circular geographic region, centred in the middle of a grid tile, where the radius of the circle is defined as the distance from the centre to the closest vertice/vertex of the geofence or geographic feature in which the closest vertice/vertex is further from the centre of the page than the closest vertice/vertex of any other geofence or geographic feature that is considered as part of the page under the description of the page above.

Figure 8:
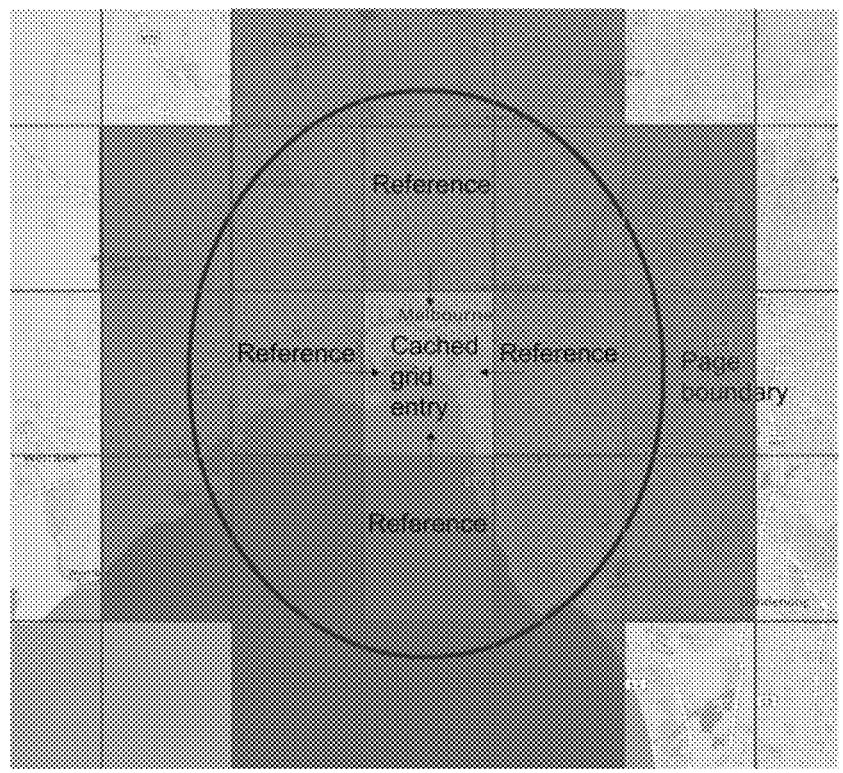
FIG. 8 depicts how references can be added to grid tiles to manage the amount of calculation required for future lookups.

FIG. 8 depicts and embodiment of how references can be virtually added to (associated with) grid tiles to manage the amount of calculation required for future lookups. That means that when a mobile device provides an LU which falls within the basic grid tile the associated page can be supplied, and not only that, if the LU indicates that the mobile computer device is within a referenced adjacent grid tile, the same generated page data is made available in response to that mobile computer device's LU provision.

It will be apparent that there will be a saving in the number of pages generated as a known previously generated page can be reused multiple times as long as the LUs received fall within one of the referenced and or associated grid tiles, in this case multiple basic sized tiles. The computing power (cycles, energy, and associated memory calls) will be significantly reduced at not only the geo-fence server end, but the mobile device is provided consistently sized pages and ultimately less pages since there is less need to have the geo-fence server re-create that which it did before even for successive LUs from the same mobile computer device as it moves from a starting location within a basic grid tile area to an adjacent basic grid tile area. The data flow to the mobile computer device is markedly reduced and the swapping in and out of pages in the memory of the mobile computer device for local distance calculations is reduced. In an embodiment the provision of a unique reference to a previously provided page can further reduce not only processor steps but also the quantity of transmitted and received data respectively of both the geo-fence server and the mobile computer device's. In one embodiment the reference could be a hash of the page. A hash is a mathematical process which creates a unique string of data which is a fixed length but which is much smaller than the originating string of data (in this case a page of data). By way of example, the hash of a 220 kB string (page of data) would be reduced to a hash of 64 bytes. When each page is hashed the hash output will be a very different hash value, even if most of the geo-fences in the two pages are exactly the same, i.e. it is enough that one latitude or longitude representation is different in only on (Lat,Long) pair of the many thousands of pairs that define the various geo-fences, for the two hashes to be completely different from each other and un-relatable to the other.

As depicted in detail in FIG. 8 the central tile (a basic grid tile) the grid entry for the page namely REF-37.8.1449 is allocated, and the tiles immediately North, South, West and East of the central tile will have the same page reference REF-37.8.1449. Thus when a mobile computer device provides an LU which falls within any of those indicated grid tiles that are known to fully fall within a page boundary, the same page of data (page reference REF-37.8.1449) will be returned, as is depicted in FIG. 6, where the surrounding grid tiles have the same page reference namely namely REF- 37.8.1449 and illustrated as darkened tiles in FIG. 8. Mobiles which provide an LU that fall within grid tiles that are checked but do not fully fall within page boundary cannot be returned with the same page of information to a request from the sending mobile computer device and will need to be supplied a newly generated page.

Cache Insertion (Page Size Boundary is Smaller than a Basic Grid Tile)

The earlier description provided a way to deal with page sizes that were a predetermined but manageable size but which when mapped out covered an area greater than a basic grid tile size and ways to enable that same page to be used when LUs from mobile devices are within one or more other basic grid sized tiles that would be adjacent the basic grid tile. The following description provides a method to deal with the situation when the number of geo-fences within a basic grid sized tile is greater than (say for example only ~1000 geo-fences) while the preferably sized page of data (e.g. includes about 256 geo-fences) but it is the aim to provide page sizes that are consistent (say about 256 geo-fences per page) and do that even though the mobile computer device is still within a basic grid tile area.

In the geo-fence server environment the aim is to reduce the number of times a page needs to be created and further to provide a consistently sized page which nominally in these embodiments is representative of 256 geo-fences, which even though the number of geo-fences is predetermined, the page size (number of kB) can vary depending on the amount of data it takes to represent those 256 geo-fences, which comes down to minimising the number of elements in the page, and which are saved temporally in the geo-fence server memory for communication/making available to the various mobile computer devices that send a request for a page of data based on the LU they send.

Figure 9:
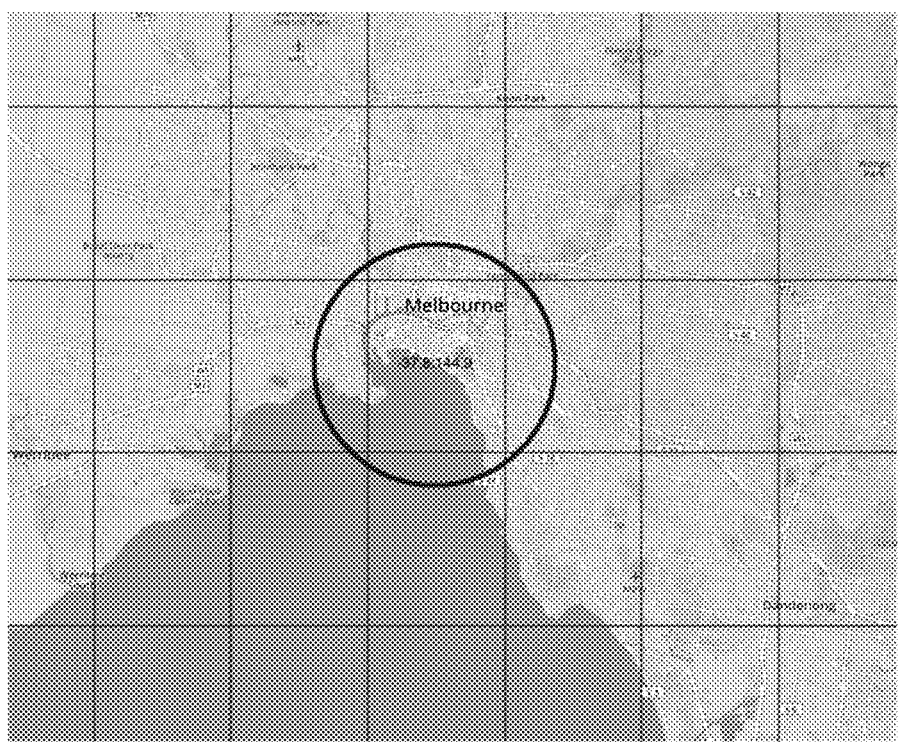
FIG. 9 depicts a page which covers only one basic grid tile completely.
Figure 10:
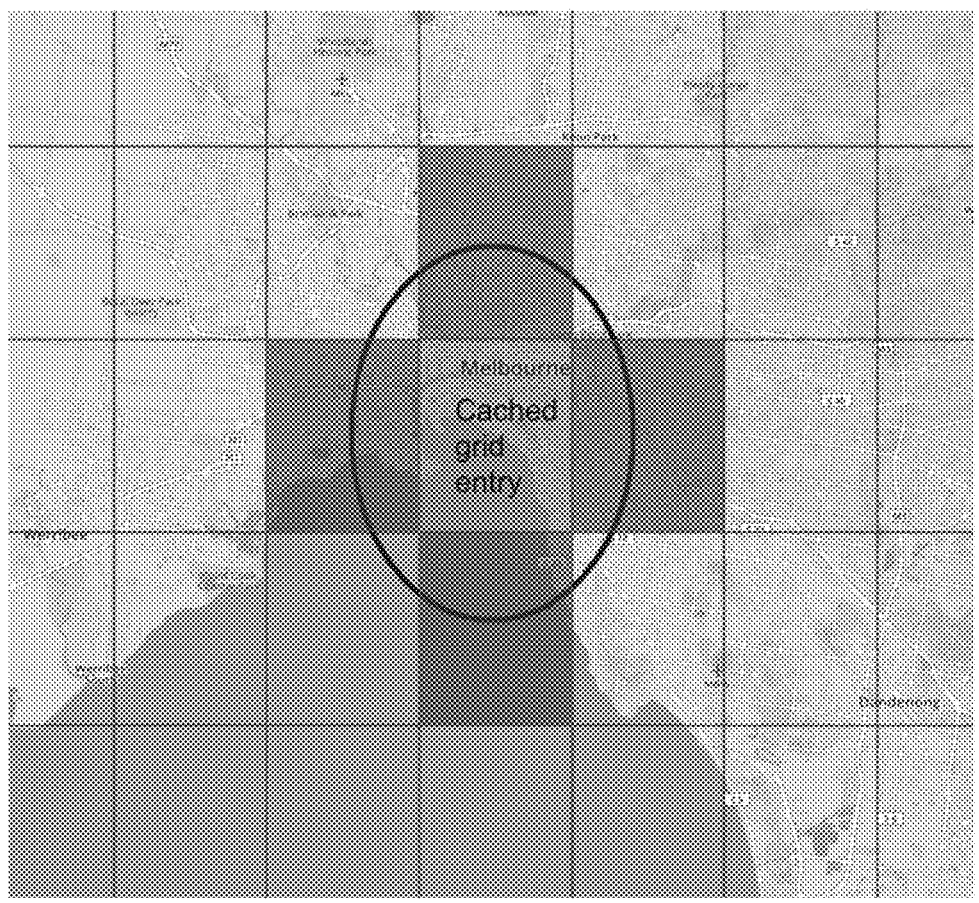
FIG. 10 depicts a page which only contains one basic grid tile completely, and how that excludes references from being added to the adjacent tiles.

In an embodiment, a method is disclosed to ensure the number of elements in a given cache entry in a geo-fence server is consistent and to manage the number of cache elements of a page of geo-fences and requests needed to retrieve them from the geo-fence server for use by a mobile computer device. In an embodiment one of the the steps includes a determination of whether the surface area coverage required to include a more consistent page size is larger than the basic grid, but not so much larger that it covered other grids. If so, then there is the step of this embodiment of creating a depth index reference to a page of geo-fences, useable by a mobile computing device, and made available to a mobile computing device. The depth index reference is nominally the base depth of 1 and this refers to the use of a basic grid tile size determined, in an embodiment, by the first decimal place of the latitude and longitude of the LU (refer to FIGS. 9 and 10).

Figure 11:
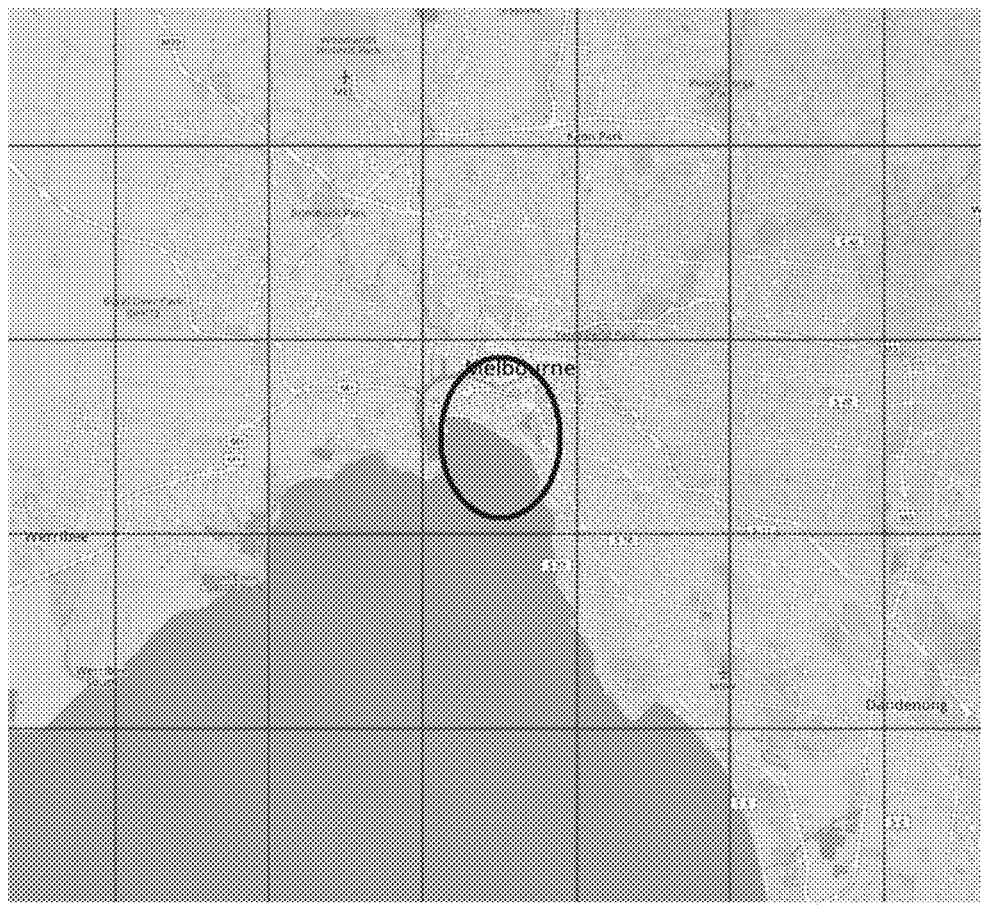
FIG. 11 depicts a page which does not cover one basic grid tile.

FIG. 11 is illustrative of when a page does not cover one basic grid tile. The earlier description provided a way to deal with page sizes that were larger than one or more basic grid tiles in area. The following description provides a method for dealing with the situation when the page size is such that it is not possible to refer to a basic grid tile but to a way of identifying a different sized grid tile which can be used to quickly provide a respective page from the geo-fence server, and which may supply from the cache of the geo-fence server a page which more closely aligns with the number of geo-fences within a page that is of a manageable size.

In an embodiment, a step includes a determination of whether the surface area coverage required to include a more consistent page size is smaller than the basic grid tile size, then an appropriate grid tile becomes a depth index grid indicator, which indicates how many times the basic grid tile must be partitioned to reach an appropriate size such that the page of geo-fence areas would cover just one of the higher indexed grid tile areas. Thereafter, when an LU is received that falls within the higher indexed depth grid tile, the appropriate page reference is associated with that query and provided/made available by the geo-fence server each time that same mobile computer device sends an LU or any other mobile computer device sends an LU that is within that same higher indexed depth grid tile. In a preferred embodiment and as illustrated in the Figures the partitioning is a quartering of successive tile areas.

In an embodiment, the geo-fence server(s) resolve the mobile computer device's LU to the first decimal point of the latitude and longitude coordinates, rounded down (so −13.45 degrees latitude and 45.23 degrees longitude would be rounded to −13.5 degrees latitude and 45.2 degrees longitude). Rounding down is just one option and is only suggested as an embodiment. It is also an embodiment to always use the rounded down value but alternative arrangements may be used.

If a grid reference contains a cached result (the number of geo-fences in the page is within the predetermined upper limit—which has been stored in the memory of the geofence server(s) for use as a page for the relevant mobiles), the geo-fence server provides/makes available that page/result to the mobile. In this example, the mobile will thus not need to update the page it is currently using, and the geo-fence server(s) do not need to make that page available to those one or more mobiles.

If a grid is of type reference, go to referred grid. If the grid that is referred to does not contain an existing cached page, return empty result. This succinctly refers to the programming approach to determination of whether to provide a new page or not based on the page reference determined by the LUs value or that it is necessary to provide a new page (i.e. new page data of relevant geo-fences).

If tile is of type depth, recursion using $0.1*(1/N)^{\wedge}(m^2)$ depth modifier as denominator (rather than 0.1) in each of the latitude and longitude axes. The value of the scaling factor (the same 0.1 coefficient referred to above) to change the size of the basic grid, would work just as well with a 0.15 coefficient, which would just make each basic grid tile larger. In this embodiment the step of recursively reducing the size of the grid is achieved by successively quartering the grid size (where $N=2$) for each increment of m, but that is a choice which can be adjusted to achieve a more rapid grid breakdown (for example, an different scaling factor where $N=3$ would result in the grid being broken down into 9 sub-grid tiles rather than 4 sub-grid tiles, potentially reducing the number of recursions needed). Note that this scaling factor can be identical to the log base in the cache insertion process described in FIG. 12 of calculating the logarithm to base ($1/N$) of the page radius multiplied by a predetermined scaling factor.

If tile is empty, return empty result, thus if there is nothing cached for the target tile, return nothing. This would typically indicate (in a cache system) that the accessing system should instead access the source directly rather than the cache.

If the number of geo-fences in the page is not less than or equal to a predetermined number of geo-fences, the geofence server will reduce the size of the grid tile by a depth index; and determining by the geo-fence server the new smaller grid tile within which the mobile computer device is located for use. Then the geo-fence server determines a new page and new page boundary having fewer geo-fences than the previous page and continues to iterate these steps until the number of geo-fences in the page is less than or equal to a predetermined number of geo-fences.

Figure 12:
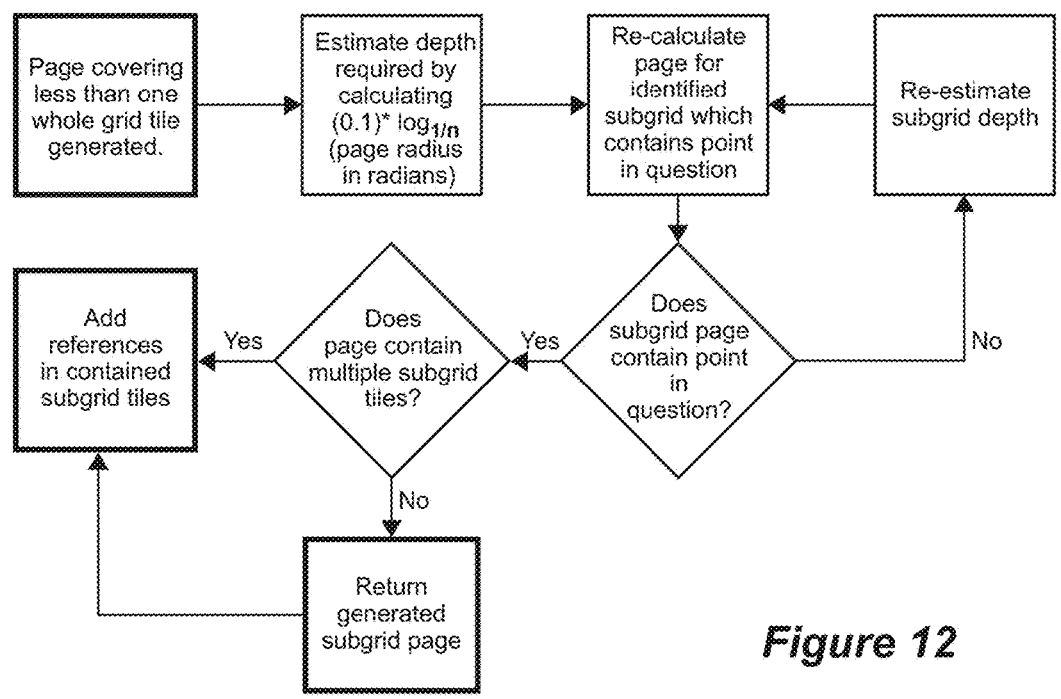
FIG. 12 depicts a flow diagram illustrating the logic followed when a page does not cover at least one basic grid tile.

An embodiment of a method is depicted in FIG. 12 which is a flow diagram of the respective steps when the grid entry fails to be covered by a first attempt to use a particular page of information. Using tiling for geographic caching is known; the complexity here is the additional logic and arrangement of circuits to ensure the number of elements in a given cache entry is consistent and to manage the number of cache elements and requests needed to retrieve them from the geo-fence server, especially when the LU is relatable to previously cached grid tile having the requisite content of geo-fences, since it is then possible to simply provide the respective page rather than needing to recalculate the page, indeed as described previously, it is possible that there are adjacent grid tiles which can use the same page and in that circumstance the return to the relevant mobile device of that page again allows the cache of the server to be used much more efficiently than having to create a page.

FIG. 12 is an embodiment of the steps of the process of producing a generated higher depth indexed grid tile page of geo-fences. In this embodiment, the steps of the method are as follows: generating a page of geo-fences that has a boundary less than predetermined depth indexed grid tile; estimating the depth index required, by calculating the logarithm to base 1/N (or the scaling factor chosen) of the generated page's radius (page radius in radians, where the page radius is determined by knowing the distance from the centre to the farthest geo-fence from the centre); recalculating the page of geo-fences for the identified higher depth indexed grid tile which contains the subject location, and if the page for the identified higher depth indexed grid tile wholly contains the grid tile for that depth then make the generated higher depth indexed grid tile page available to the mobile computer device; otherwise re-estimate the higher depth indexed grid depth and recalculate the page of geo-fences.

Figure 13:
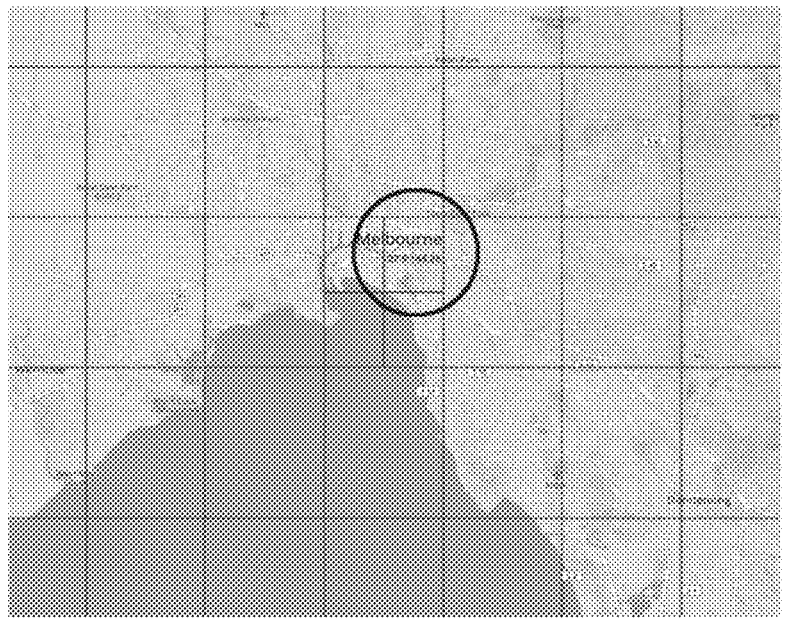
FIG. 13 depicts a page resulting from the logic undertaken when a higher depth index grid page is smaller than a basic grid tile.

As depicted in FIG. 13 if the higher depth indexed grid tile is wholly contained within the page then it is returned as the final page resulting from the logic undertaken when a higher depth index grid page is smaller than a basic grid tile or a previously higher depth index grid page. The process is recursive until the number of geo-fences within an encompassing page is less than a predetermined number, say 256 in one example.

Figure 14:
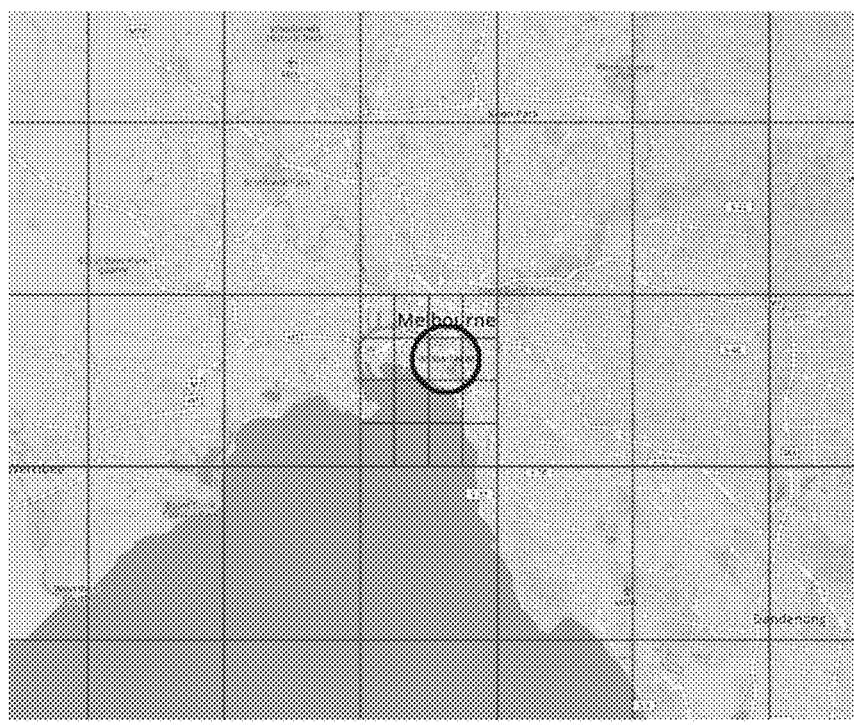
FIG. 14 depicts a page in a higher density environment than depicted in FIG. 13, and therefore with a higher depth index (resulting in a sub-grid with smaller grid tiles).

As depicted in FIG. 14 the wholly contained higher depth indexed grid tile is smaller than that depicted in FIG. 13 indicating a final page in a higher density environment, and therefore with a higher depth index (resulting in a new grid with successively smaller tiles). This approach ensures that no matter the density of geo-fences in an area the method disclosed can deal with the management of the page sizes and the referencing to previously generated pages so as to allow the number of elements in a given cache entry in a geo-fence server to be similar or consistent and to optimise the number of cache elements of a page of geo-fences and requests needed to retrieve them from the geo-fence server for use by a mobile computer device. Use of the term similar is meant to allow for variation of the number of geo-fences in a page to vary from one page to another, say for example, from 200 to 300 per page. The exact quantity is not critical but design factors, such as the data size of the geo-fences (which directly relates to geo-fence complexity) and circuit elements such as memory chips and disc space allocation, typically use $2^n$ digital data capacity blocks or $2^n \times$byte sized digital data input/output data transfer blocks.

Although the invention has been disclosed in its preferred forms, the specific embodiments thereof as disclosed and illustrated herein are not to be considered m a limiting sense, because numerous variations are possible. Applicants regard the subject matter of their invention to include all novel and nonobvious combinations and sub-combinations of the various elements, features, functions, and/or properties disclosed herein. No single feature, function, element or property of the disclosed embodiments is essential. The following claims define certain combinations and sub-combinations of features, functions, elements, and/or properties that are regarded as novel and nonobvious. Other combinations and sub-combinations may be claimed through amendment of the present claims or presentation of new claims in this or a related application. Such claims, whether they are broader, narrower, equal, or different m scope to the original claims, also are regarded as included within the subject matter of applicants' invention.

The invention claimed is:

1. A method to ensure a number of cache elements in a given cache entry in a geo-fence server is consistent and to manage the number of cache elements of a page of geo-fences and manage requests needed to retrieve the cache elements from the cache memory of a geo-fence server for use by a mobile computer device having a location determination mechanism having provided a location update to the geo-fence server, comprising:
   generating a page of geo-fences that has a boundary less than a predetermined depth indexed grid tile;
   estimating a depth index required, by calculating the logarithm to base (1/N), where N is a whole number, of the page radius, multiplied by a predetermined scaling factor;
   recalculating the page of geo-fences for an identified higher depth indexed grid tile generated based upon the estimated depth index which contains the subject location update within the calculated page radius, and if the identified higher depth indexed grid tile page contains the location of the location update and also contains multiple other higher depth indexed grid tiles then re-estimating the sub-grid depth index; and
   responsive to the generated higher depth indexed grid tile page covering at least one higher indexed grid tile, making the generated higher depth indexed grid tile page available to the mobile computer device;
   otherwise, re-estimating the higher depth indexed grid depth and recalculating the page of geo-fences.

2. The method of claim 1, further comprising:
   responsive to determining that the identified higher depth indexed grid tile page contains multiple other higher depth indexed grid tiles, associating references to the multiple other higher depth indexed grid tiles with the higher indexed grid tile page.

3. The method of claim 1, wherein the identified higher depth indexed grid tile corresponds to a grid tile reduced in size from the predetermined depth indexed grid tile by the estimated depth index that contains the location of the location update.

4. The method of claim 1, wherein the generated higher depth indexed grid tile page contains less than a predetermined number of geo-fences.

5. The method of claim 1, wherein the page radius is determined based upon a distance between a first location corresponding to a center of the page, and a second location corresponding to a geo-fence of the page that is farthest from the first location.

6. The method of claim 1, further comprising generating the higher depth indexed grid tile by partitioning the predetermined depth indexed grid tile based upon the estimated depth index.

7. A non-transitory computer program product for ensuring a number of cache elements in a given cache entry in a geo-fence server is consistent and to manage the number of cache elements of a page of geo-fences and manage requests needed to retrieve the cache elements from the cache memory of a geo-fence server for use by a mobile computer device having a location determination mechanism having provided a location update to the geo-fence server, the computer program product comprising a non-transitory computer-readable storage medium containing computer program code that when executed causes one or more processors to perform the steps of:

generating a page of geo-fences that has a boundary less than a predetermined depth indexed grid tile;

estimating a depth index required, by calculating the logarithm to base (1/N), where N is a whole number, of the page radius, multiplied by a predetermined scaling factor;

recalculating the page of geo-fences for an identified higher depth indexed grid tile generated based upon the estimated depth index which contains the location update within the calculated page radius, and if the identified higher depth indexed grid tile page contains the location of the location update and also contains multiple other higher depth indexed grid tiles then re-estimating the sub-grid depth index; and responsive to the generated higher depth indexed grid tile page covering at least one higher indexed grid tile, making the generated higher depth indexed grid tile page available to the mobile computer device;

otherwise, re-estimating the higher depth indexed grid depth and recalculating the page of geo-fences.

8. The computer program product of claim 7, wherein the computer program code further causes the one or more processors to perform the steps of:

responsive to determining that the identified higher depth indexed grid tile page contains multiple other higher depth indexed grid tiles, associating references to the multiple other higher depth indexed grid tiles with the higher indexed grid tile page.

9. The computer program product of claim 7, wherein the identified higher depth indexed grid tile corresponds to a grid tile reduced in size from the predetermined depth indexed grid tile by the estimated depth index that contains the location of the location update.

10. The computer program product of claim 7, wherein the generated higher depth indexed grid tile page contains less than a predetermined number of geo-fences.

11. The computer program product of claim 7, wherein the page radius is determined based upon a distance between a first location corresponding to a center of the page, and a second location corresponding to a geo-fence of the page that is farthest from the first location.

12. The computer program product of claim 7, wherein the computer program code further causes the one or more processors to perform the steps of generating the higher depth indexed grid tile by partitioning the predetermined depth indexed grid tile based upon the estimated depth index.

13. A computing system for ensuring a number of cache elements in a given cache entry in a geo-fence server is consistent and to manage the number of cache elements of a page of geo-fences and manage requests needed to retrieve the cache elements from the cache memory of a geo-fence server for use by a mobile computer device having a location determination mechanism having provided a location update to the geo-fence server, comprising:

a receiver configured to receive geo-location information from a geo-location determination mechanism of a mobile computer device;

at least one processor for performing geo-location determination of entry by the computing device to a predetermined geo-fenced region defined in at least two dimensions, configured to perform the steps of:

generating a page of geo-fences that has a boundary less than a predetermined depth indexed grid tile;

estimating a depth index required, by calculating the logarithm to base (1/N), where N is a whole number, of the page radius, multiplied by a predetermined scaling factor;

recalculating the page of geo-fences for an identified higher depth indexed grid tile generated based upon the estimated depth index which contains the location update within the calculated page radius, and if the identified higher depth indexed grid tile page contains the location of the location update and also contains multiple other higher depth indexed grid tiles then re-estimating the sub-grid depth index; and responsive to the generated higher depth indexed grid tile page covering at least one higher indexed grid tile, making the generated higher depth indexed grid tile page available to the mobile computer device;

otherwise, re-estimating the higher depth indexed grid depth and recalculating the page of geo-fences.

14. The computing system of claim 13, wherein the at least one processor is further configured to perform the steps of:

responsive to determining that the identified higher depth indexed grid tile page contains multiple other higher depth indexed grid tiles, associating references to the multiple other higher depth indexed grid tiles with the higher indexed grid tile page.

15. The computing system of claim 13, wherein the identified higher depth indexed grid tile corresponds to a grid tile reduced in size from the predetermined depth indexed grid tile by the estimated depth index that contains the location of the location update.

16. The computing system of claim 13, wherein the generated higher depth indexed grid tile page contains less than a predetermined number of geo-fences.

17. The computing system of claim 13, wherein the page radius is determined based upon a distance between a first location corresponding to a center of the page, and a second location corresponding to a geo-fence of the page that is farthest from the first location.

18. The computing system of claim 13, wherein the at least one processor is further configured to perform the steps of generating the higher depth indexed grid tile by partitioning the predetermined depth indexed grid tile based upon the estimated depth index.

* * * * *